US00RE39522E

(19) United States
(12) Reissued Patent
Ishiyama

(10) Patent Number: US RE39,522 E
(45) Date of Reissued Patent: *Mar. 20, 2007

(54) ULTRAVIOLET RAY IRRADIATION EQUIPMENT HAVING SCRAPER RINGS FITTED TO LIGHT TRANSMISSION TUBES

(75) Inventor: Eiichi Ishiyama, Hachioji (JP)

(73) Assignee: Photoscience Japan Corporation, Tokyo (JP)

( * ) Notice: This patent is subject to a terminal disclaimer.

(21) Appl. No.: 10/447,390

(22) Filed: May 28, 2003

Related U.S. Patent Documents

Reissue of:
(64) Patent No.: 5,874,740
Issued: Feb. 23, 1999
Appl. No.: 08/818,965
Filed: Mar. 14, 1997

U.S. Applications:
(63) Continuation of application No. 09/793,802, filed on Feb. 23, 2001, now Pat. No. Re. 38,173.

(30) Foreign Application Priority Data

Mar. 14, 1996 (JP) ..... 8-084549

(51) Int. Cl.
*C02F 1/32* (2006.01)

(52) U.S. Cl. ..... 250/431; 250/436; 422/24; 422/186.3

(58) Field of Classification Search ..... 250/431, 250/436; 422/24, 186.3, 906
See application file for complete search history.

(56) References Cited

U.S. PATENT DOCUMENTS

| | | | | | |
|---|---|---|---|---|---|
| 3,182,193 | A | * | 5/1965 | Ellner et al. | 250/43.5 |
| 3,562,520 | A | * | 2/1971 | Hippen | 250/43 |
| 4,367,410 | A | * | 1/1983 | Wood | 250/431 |
| 5,133,945 | A | * | 7/1992 | Hallett | 422/186.3 |
| 5,227,140 | A | * | 7/1993 | Hager et al. | 422/186.3 |
| 5,401,474 | A | * | 3/1995 | Hager et al. | 422/186.3 |
| 5,418,370 | A | * | 5/1995 | Maarschalkerweerd | 250/436 |
| 5,501,843 | A | * | 3/1996 | Peterson | 422/186.3 |
| 5,590,390 | A | | 12/1996 | Maarschalkerweerd | 422/186.3 |
| 5,874,740 | A | | 2/1999 | Ishiyama | 250/431 |
| RE38,173 | E | | 7/2003 | Ishiyama | 250/431 |

* cited by examiner

*Primary Examiner*—Jack I. Berman
(74) *Attorney, Agent, or Firm*—Fay, Sharpe, Fagan, Minnich & McKee, LLP

(57) ABSTRACT

An ultraviolet light irradiation apparatus providing combined mechanical and chemical cleaning of light irradiation tubes for removing radiation blocking precipitates from the surface of the tubes. A scraper ring is fitted to the outside of each of the tubes and includes a chamber for receiving a relatively small quantity of cleaning solution. The scraper rings are reciprocated in a sliding action along the tubes which action synergistically acts with the cleaning solution to remove precipitates from the tube surface including fine particles lodged in concave pits in the tube surface.

7 Claims, 2 Drawing Sheets

ULTRAVIOLET RAY IRRADIATION EQUIPMENT HAVING SCRAPER RINGS FITTED TO LIGHT TRANSMISSION TUBES

Matter enclosed in heavy brackets [ ] appears in the original patent but forms no part of this reissue specification; matter printed in italics indicates the additions made by reissue.

*This is a continuation reissue application of Ser. No. 09/793,802, filed on Feb. 23, 2001, now U.S. Pat. No. Re. 38,173.*

*Notice: More than one reissue application has been filed for the reissue of U.S. Pat. No. 5,874,740. The reissue applications are application Ser. Nos. 09/793,802, now U.S. Pat. No. Re38,173, and Ser. No. 10/447,390 (the present application), both of which are reissues of U.S. Pat. No. 5,874,740.*

FIELD OF THE INVENTION

The present invention is concerned with ultraviolet (hereinafter "UV") ray irradiation equipment used for irradiation of untreated water for sterilization, oxidative decomposition of organics, decomposition of harmful substances, etc.

DESCRIPTION OF THE PRIOR ART AND RELATED INFORMATION

When conventional UV irradiation equipment has been used for an extended period of time for the purpose of removing impurities from untreated water such as sewage, iron and hardness components such as calcium and so forth precipitate on the surface of the UV ray transmission tube(s) surrounding an internal UV ray irradiation lamp(s) since this surface comes in contact with the untreated water. These precipitates obstruct the transmission of UV rays through the UV ray transmission tube(s) surrounding the internal UV ray irradiation lamp (s) and deteriorate the irradiation efficiency thereby degrading the purity of treated water. To cope with the above-mentioned deterioration of UV ray transmission efficiency due to fouling on the surface of the UV ray transmission tube(s), mechanical cleaning means have been employed. In particular, scrapers made of rubber, Teflon and the like have been used to physically clean the surface of the UV ray transmission tube(s). However, this physical method of scraping the surface of the UV ray transmission tube(s) leaves much to be desired as hardness components and other scale deposited on the surface of the UV ray transmission tube(s) usually consist of very fine particles which tend to penetrate into and clog concave pits on the surface, thereby making it difficult to remove such scale by scrapers.

Alternatively, the UV ray transmission tube is immersed in a tank filled with a cleaning solution such as a solution of weak acids, e.g. phosphoric acid, a solution of scale dispersant or the like, thereby removing scale such as hardness components from the surface of the UV ray transmission tube. However, such chemical cleaning of the surface of the UV ray transmission tube has the following drawbacks:

(1) It is cumbersome and time-consuming to disassemble a UV ray transmission tube on the surface of which scale such as hardness components has deposited and to immerse the tube in a cleaning tank.

(2) In order to carry out the above-mentioned cleaning work, ongoing UV irradiation has to be suspended, which in turn results in deterioration of the UV irradiation efficiency.

(3) An excessive quantity of cleaning solution has to be used in the cleaning tank, which entails an expensive cleaning cost.

(4) The cleaning work is not amenable to automation and cannot therefore go with the trend of equipment automation.

Therefore, a need presently exists for a solution to the above-noted problem of UV ray transmission tube fouling which avoids the disadvantages of prior attempted solutions employing mechanical and chemical cleaning of UV transmission tubes.

SUMMARY OF THE INVENTION

It is a principal object of this invention to provide novel means for thoroughly washing out from the surface of a UV ray transmission tube those fine particles deposited in concave pits on the tube surface which can not be removed physically by conventional mechanical methods, thereby to keep up the UV transmission efficiency of the UV irradiation tube.

Furthermore, this invention permits achieving the following objectives which cannot be carried out with chemical cleaning using such conventional cleaning solutions such as solutions of weak acids, such as phosphoric acid, and scale dispersants:

(1) in situ scale comprised of hardness components, etc. on a UV ray transmission tube may be easily cleaned off without disassembling the UV ray irradiation unit and taking out the tube fouled with the scale;

(2) UV irradiation efficiency may be maintained without interrupting the UV irradiation for the cleaning work to remove scale deposited on the UV transmission tube;

(3) cleaning costs may be minimized by reducing the consumption of cleaning solution by feeding a small quantity of a cleaning solution to the surface of the UV ray transmission tube and cleaning off scale, comprised of hardness components, etc. deposited on the surface of the UV ray transmission tube, by means of a scraper ring; and (4) automation of the cleaning operation is facilitated thereby going with the desirable trend of equipment automation.

This invention achieves the above objectives by providing a UV irradiation apparatus in which a UV ray transmission tube(s), having internal UV ray lamp(s), is externally fitted with a scraper ring(s). UV ray irradiation of untreated water for sterilization, oxidative decomposition of organics, decomposition of harmful substances, etc. may be continued without interruption while cleaning UV ray transmission tube(s) by reciprocally sliding the scraper ring over the outer circumference surface of the said tube(s). The scraper ring(s) has a built-in cleaning solution chamber in contact with the outer circumference surface of said UV transmission tube(s) and is slidably and tightly fitted to said tube(s). A cleaning solution supply line communicates with said cleaning solution chamber to supply the cleaning solution.

This invention further provides a UV irradiation apparatus in which a UV ray transmission tube having an internal UV ray lamp(s) is externally fitted with a scraper ring(s) by fitting sealing material such as O-rings at a position on the surface of said UV ray transmission tube with which said scraper ring comes in contact and adjacent to the cleaning solution chamber(s) of the scraper ring(s).

This invention further provides a UV irradiation apparatus including means for reciprocally and repeatedly moving said scraper ring(s) over the circumference surface of the UV ray transmission tube(s). For example, said scraper ring(s) may be fitted to a movable frame which is fitted to a rotating screw which is externally fitted to said UV ray transmission tube and rotated forward and in reverse by means of a drive unit such as a motor.

Further features and advantages of the present invention will be appreciated by review of the following detailed description of the invention.

DETAILED DESCRIPTION OF THE INVENTION

Figure 1:
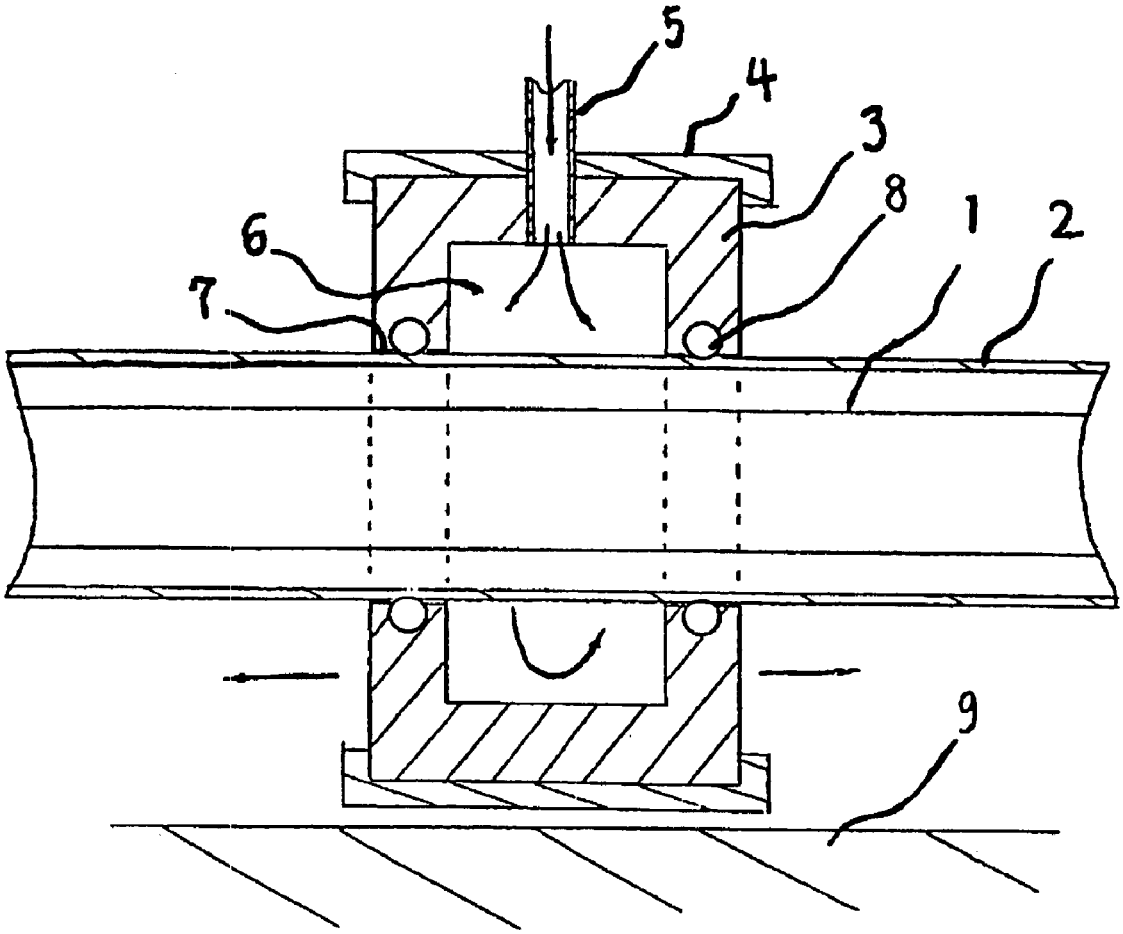
FIG. 1 is a sectional view of a UV ray irradiation apparatus in accordance with the present invention in which a scraper ring having an internal cleaning solution chamber is slidably fitted on the circumference surface of a light transmission tube.

An exemplary embodiment of the UV irradiation apparatus having a UV ray transmission tube(s) fitted with a scraper ring(s) according to this invention and as applied to sterilization of a liquid containing bacteria will be explained with reference to the drawings. As illustrated in FIG. 1, a flow route is formed for the sterilization of a liquid in a UV irradiation unit by horizontally (or vertically) arranging therein a light transmission tube 2 made of quartz glass and internally fitted with a light irradiation lamp such as, for example, a UV irradiation lamp 1.

A scraper ring 3 with a cover 4 is slidably fitted to the light transmission tube 2 which encloses UV irradiation lamp 1. More specifically, scraper ring 3 is capable of being slid horizontally along the circumference of light transmission tube 2. As shown in FIG. 1, this scraper ring 3 has an internal cleaning solution chamber 6, which contains a cleaning solution such as a phosphoric acid solution, and which communicates with a cleaning solution feed piping 5. As indicated earlier, the light transmission tube 2, preferably made of quartz glass and enclosing an internally fitted light irradiation lamp, may also be aligned vertically. In such an embodiment, the scraper ring 3 is slid up and down (reciprocally) along the circumference of said light transmission tube 2.

The scraper ring 3 may be made of an elastic material, such as for example rubber, and in this case it tightly comes in contact with the outer circumference surface of the light transmission tube 2. Because the tip 7 of said scraper ring is elastic, the solution (such as a phosphoric acid solution) stored in said cleaning chamber 6 is prevented from leaking from any interstice between scraper ring 3 and cleaning solution chamber 6.

When the scraper ring 3 is made of a nonelastic material such as Teflon and stainless steel, any leakage of cleaning solution from the interstice between said scraper ring 3 and the cleaning chamber 6 can be prevented by fitting sealing materials 8, such as O-rings, at the ends 7 of the scraper ring 3 or at positions where the scraper ring 3 comes in contact with the light transmission tube 2 and adjacent to the cleaning solution chamber 6.

Even when the scraper ring 3 is made of an elastic material such as rubber, sealing materials 8 such as O-rings may be fitted at the ends 7 of the scraper ring 3 and adjacent to the cleaning solution chamber 6 thereby securely preventing any leakage of cleaning solution from the interstice between the scraper ring 3 and the cleaning chamber 6.

The scraper ring 3 is reciprocally slid over the circumference of said light transmission tube 2, thereby bringing about a synergistic effect of the scraper ring 3 and the cleaning solution stored in the cleaning solution chamber to dislodge and clean off not only scale comprising of hardness components deposited on the circumference surface of said light transmission tube 2 but also scale comprising of fine particulate hardness components which have penetrated into concave pits on the surface of the light transmission tube 2. The scraper ring 3 may be reciprocally slid either manually or automatically by any known sliding means such as a hydraulic cylinder.

Figure 2:
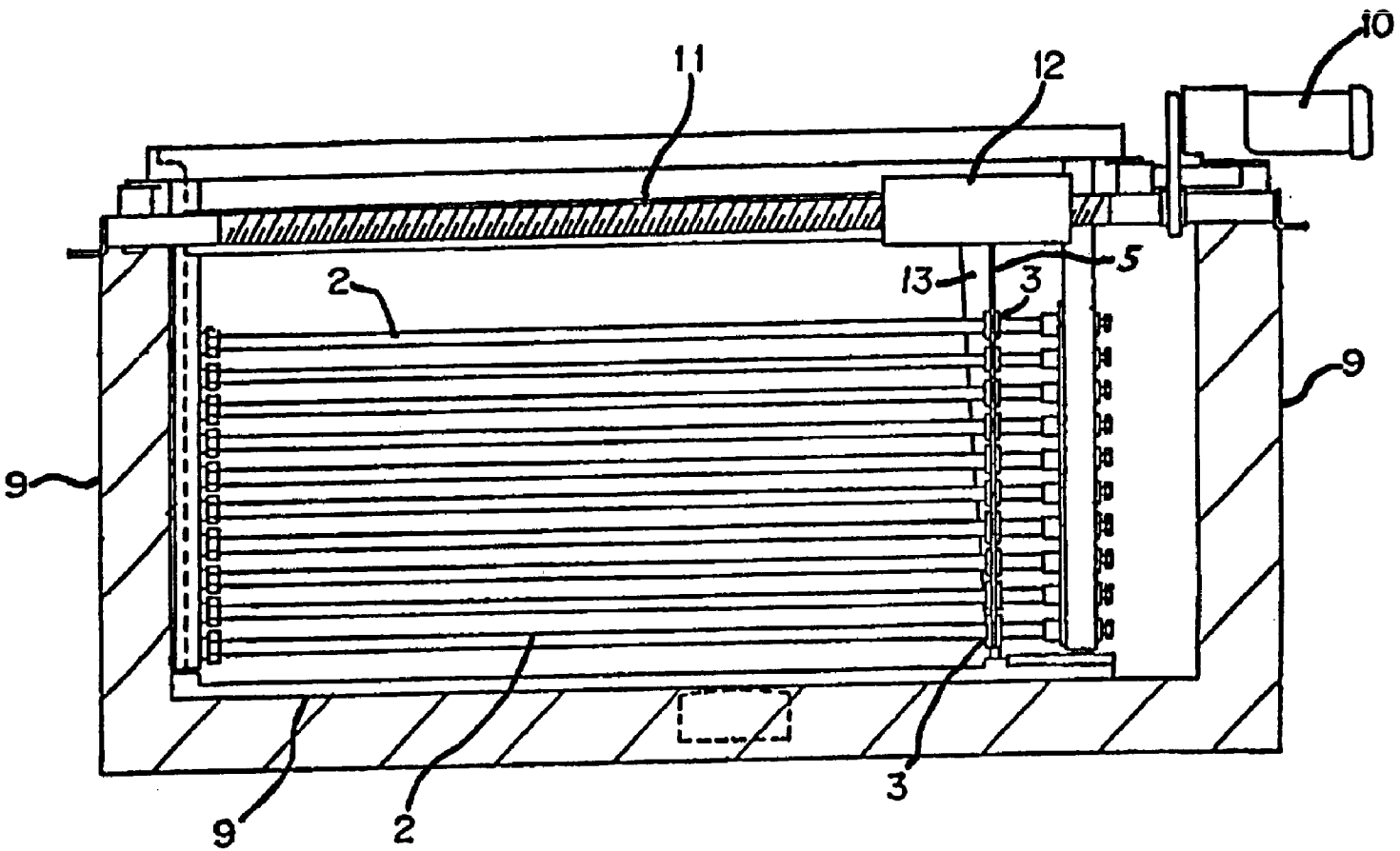
FIG. 2 is an explanatory drawing of the UV ray irradiation apparatus of the present invention in which a plurality of scraper rings, each slidably fitted to the circumference surface of each light transmission tube, are connected en bloc to a moving frame.

For instance, as illustrated in FIG. 2 it offers convenience to automatically move reciprocally (back and forth) the scraper rings 3 along the circumferences of the light transmission tubes 2 by connecting the scraper rings 3 to a sliding frame 12 which is in turn slidably fitted to a rotating screw stem 11 rotated normally and reversely by means of a drive unit 10.

When a plurality of said light transmission tubes 2 internally fitted with UV irradiation lamps are installed in a UV ray irradiation unit, the scraper ring 3 is slidably fitted to each light transmission tube or fitted to each light transmission tube so that the scraper rings 3 as one member are slid reciprocally (back and forth) over the circumference of light transmission tubes 2, while a plurality of said slide rings 3 are fitted to a support 13 of said sliding frame 12 which is slidably fitted to the aforementioned revolving screw stem 11. As also shown in FIG. 2 the cleaning solution is fed to the respective scraper rings 3 via common feed piping 5 which moves with the scraper rings 3 as they are reciprocated up and down the light transmission tubes 2.

Examples of UV lamps which can be used include low pressure sterilization lamps with a dominant wave length of 254 nm, low pressure ozone lamps with dominant wave lengths of 185 and 254 nm, and medium- and high-pressure lamps with dominant wave length lengths of 185, 254 and 365 nm. In addition, sunlight lamps, chemical lamps, black light lamps, metal halide lamps, sodium lamps and other lamps with wave lengths of 700 nm or longer can also be used depending upon the application or the purpose of light irradiation treatment.

Quartz glass which is relatively inexpensive is often used as the material of construction of light transmission tubes 2. As mentioned earlier, Teflon can also be used as this material of construction. In addition, any materials that have high UV transmissivities and do not release any leachables such as fluorocarbon resins may be used as the material of construction for tubes 2.

Examples of suitable material for construction of scraper rings 3 include elastic materials such as a rubber and Teflon, and stainless steel. In addition, ceramics and plastics such as polypropylene and polyethylene which are resistant to chemicals may also be used. As mentioned earlier, the scraper ring 3 has an internal cleaning chamber 3 which communicates with a cleaning solution feed line 5. The scraper ring 3 is so fitted to the light transmission tube 2 that the scraper ring 3 can be slid reciprocally (back and forth) along the circumference of the tube 2.

A phosphoric acid solution which is relatively inexpensive is suitable as the cleaning solution to be fed automatically to the cleaning solution chamber 6 of the scraper ring 3. Besides a phosphoric acid solution, a solution of any weak acid such as citric acid may be used. In addition, a solution of any chemical which can wash out and remove scale comprised of hardness components, etc. may be used as the cleaning solution. An optimum concentration of these cleaning solutions ranges from 5 to 10% in the case, for example, of a phosphoric acid solution.

The cleaning solution should preferably fill, under pressure, the cleaning solution chamber 6 of the scraper ring(s) 3, and come in contact with the entire circumference surface of the light transmission tube 2.

The frequency of the cleaning of the light transmission tube 3 should be determined depending upon the quantity of scale (comprised of hardness components, etc.) which has deposited on the circumference surface of the light transmission tube 2, especially the quantity of scale of fine particles comprised of hardness components, etc. which has penetrated into concave pits on the circumference surface of the light transmission tube 2, the kind and concentration of the cleaning solution and so forth. Usually, it suffices to slide the scraper ring 3 to clean the circumference of the light transmission tube 2 two to three times a day.

The manner of operation of the UV ray irradiation apparatus 9 equipped with the scraper ring(s) 3 fitted on the light transmission tube(s) 2 according to this invention will be explained. When untreated water containing bacteria has been fed to the UV ray irradiation apparatus 9 to sterilize the water, scale comprised of hardness components such as iron and calcium is deposited on the circumference surface of the light transmission tube(s) 2 and concave pits on the circumference surface of the light transmission tube(s) 2 are clogged with scale of fine particles comprised of hardness components, etc. with the result that the UV ray irradiation dose transmitted through the UV ray transmission tube(s) 2 drops.

In order to cope with such drop in the UV ray irradiation dose, the circumference of the light transmission tube(s) 2 is cleaned by reciprocally sliding the scraper ring(s) 3 over the circumference surface of the light transmission tube(s) 2 by means of the moving frame 12 reciprocally moved by virtue of the revolving screw stem 11 driven by the drive unit 10 (such as a motor) while a cleaning solution such as a phosphoric acid solution is fed from a cleaning solution storage tank (not shown) to the cleaning solution chamber 6 of the scraper ring(s) 3 via the cleaning solution feed pipe 5. The cleaning solution in the cleaning solution chamber 6 may be recirculated by connecting the cleaning solution chamber 6 and the cleaning solution tank via a cleaning solution outlet pipe (not shown). Alternatively, the cleaning solution tainted with foulants may be discharged to a cleaning solution waste tank (not shown) without recirculating the cleaning solution waste.

It will therefore be appreciated that this invention provides a UV ray irradiation apparatus capable of continuously, i.e., without suspending its operation, dislodging and washing out not only scale comprised of hardness components, etc. which is deposited on the circumference surface of the light transmission tubes 2 but also scale comprised of fine particles of harness components, etc. which clog concave pits on the circumference surface of the light transmission tube 2 by virtue of a synergistic effect of the dislodging action created by sliding the scraper ring 3 over the circumference surface of the light transmission tube 2 and the cleaning action of a small quantity of cleaning solution such as a phosphoric acid solution which is stored in the cleaning solution chamber 6 of the scraper ring 3. In this way, any drop in the dose of UV rays transmitted through the UV transmission tube 2 is corrected.

The cleaning of the light transmission tube 2 by reciprocally (back and forth) sliding the scraper ring 3 over the circumference surface of the light transmission tube 2 may be automatically initiated in response to any drop in the UV irradiation dose transmitted through the light transmission tube 2 as detected by means of a known UV ray does meter. Alternatively, the cleaning of the light transmission tube 2 may be started periodically and intermittently by means of a timer which is preset after confirming the number of bacteria in the treated (UV ray irradiated) water, sterilization conditions and so forth.

Three sets of UV ray irradiation equipment each having a light transmission tube internally fitted with a 100V low pressure mercury lamp made of quartz glass and having 253.7 nm wave length (Product No. AY-4 manufactured by Japan Photo Science Co., Ltd.) were installed. The first set in accordance with the present invention was equipped with a slidable scraper ring made of rubber and having an internal cleaning solution chamber with a capacity of holding 5 cc of chemical solution. The second set had a conventional scraper ring made of rubber and slidably equipped. The third set was also a conventional UV ray irradiation unit without a scrape ring.

Secondary sewage effluent containing $10^3$ n/ml of E. coli was sent to each set of the UV ray irradiation equipment at a flow rate of 0.08–1.1 m/s, and was irradiated with UV rays at a dose level of 4 nw/cm$^2$. to sterilize E. coli in the secondary sewage effluent.

While a 5% phosphoric acid solution was fed to the cleaning solution chamber of the scraper ring of the first set, the scraper ring was slid twice a day to clean the light transmission tube. The scraper ring of the second set was also slid twice a day to clean the light transmission tube. The light transmission tube of the third set was not cleaned.

The sterilization of the secondary sewage effluent as mentioned above was carried out for six months using the three sets of UV ray irradiation equipment. As a result, the following sterilization performance data were obtained.

| | UV ray Transmission Rate* | Flow Rate to Achieve 99% Sterilization per Lamp** | Power Consumption | Power Efficiency |
|---|---|---|---|---|
| 1st Set (this invention) | 98% | 9.8 m$^3$/hr. | 10.2 W/m$^3$ | 2.33 |
| 2nd Set (conventional) | 65% | 6.5 m$^3$/hr. | 15.4 W/m$^3$ | 1.55 |
| 3rd Set (conventional) | 42% | 4.2 m$^3$/hr. | 23.8 W/m$^3$ | 1.00 |

*Rate of UV Ray Transmission through Light Transmission Tube
**Flow rate of the secondary sewage efficient per one lamp that allowed 99% sterilization The present invention provides a UV ray irradiation apparatus capable of brining about a synergistic effect of dislodging action of a scraper ring(s) and cleaning action of a small quantity of cleaning solution stored in a cleaning solution chamber(s) of the scraper ring(s) thereby dislodging and washing out not only scale comprised of hardness components, etc. which is deposited on the circumference surface of a light transmission tube(s) but also scale comprised of fine particles of hardness components, etc. which clogs concave pits on the circumference surface of the light transmission tube(s). In this way, the UV ray irradiation equipment in accordance with the present invention brings about the beneficial effects of easily and surely restoring (by about 98%) the irradiation dose lost through the light transmission tube(s), increasing the UV ray irradiation flow rate (1.5 to 2 times), and the power efficiency of UV ray lamp thereby enhancing the overall light irradiation efficiency.

Unlike the conventional chemical cleaning using a weak acid solution, a scale dispersant solution or the like, the present invention also permits easily and surely washing out scale composed of hardness components, etc. and deposited on a light transmission tube(s) without disassembling a UV ray irradiation unit and taking out the light transmission tube(s). Hence, the present invention also confers a benefit of not necessitating any suspension of the UV ray irradiation, and permits equipment automation. These benefits of the present invention lead to an enhanced UV ray irradiation efficiency.

In the UV ray irradiation equipment in accordance with the present invention, the scraper ring(s) can be slid reciprocally over the circumference surface of the light transmission tube(s) by rotating, through a drive unit, a revolving screw stem which is connected to the scraper ring(s) via a moving frame. This drive configuration facilitates automation of the cleaning operation. This driving configuration also permits use of a plurality of light transmission tubes each internally fitted with a light irradiation lamp to cope with large throughput requirements.

In the UV ray irradiation equipment in accordance with the present invention, a sealing material(s) such as an O-ring(s) may be fitted on the circumference surface of the light transmission tube with which the scraper ring comes in contact and adjacent to the cleaning chamber of the scraper ring. In this way, any leakage of the cleaning solution from the interstice of the scraper ring and its cleaning solution chamber can be prevented.

What is claimed is:

[1. An ultraviolet light irradiation apparatus for irradiating untreated water or other fluids, comprising:

a light transmission tube having an internal light irradiation lamp;

a scraper ring slidably and tightly fitted to the circumference surface of the light transmission tube;

said scraper ring having an internal cleaning solution chamber communicating with means for providing a chemical solution;

wherein said scraper ring is movably mounted so as to be reciprocally moved over the circumference surface of said light transmission tube to clean said light transmission tube and wherein said means for providing a chemical solution feeds the cleaning solution into said cleaning solution chamber as said scraper ring is reciprocally moved; and mechanical means for reciprocally sliding said scraper ring over the circumference surface of said light transmission tube.]

[2. The ultraviolet ray irradiation apparatus as claimed in claim 1, further comprising a sealing material fitted against the surface of said light transmission tube and adjacent to said cleaning solution chamber.]

[3. The ultraviolet ray irradiation apparatus as claimed in claim 2, wherein the sealing material is an O-ring.]

[4. The ultraviolet ray irradiation apparatus as claimed in claim 1, wherein the means for reciprocally sliding comprises a moving frame fitted to a rotating screw stem installed externally to said light transmission tube, and a drive means for rotating said screw stem in normal and reverse order.]

[5. The ultraviolet ray irradiation apparatus as claimed in claim 4, wherein the drive means is a motor.]

[6. The ultraviolet ray irradiation apparatus as claimed in claim 2, further comprising means for reciprocally sliding said scraper ring over the circumference surface of said light transmission tube.]

[7. The ultraviolet ray irradiation apparatus as claimed in claim 6, wherein the means for reciprocally sliding comprises a moving frame fitted to a rotating screw stem installed externally to said light transmission tube, and a drive means for rotating said screw stem in normal and reverse order.]

[8. The ultraviolet ray irradiation apparatus as claimed in claim 7, wherein the drive means is a motor.]

[9. The ultraviolet ray irradiation apparatus as claimed in claim 1, wherein the scraper ring is composed of an elastic material.]

[10. The ultraviolet ray irradiation apparatus as claimed in claim 1, wherein the cleaning solution chamber has an open annular configuration such that the opening portion is adjacent to and circles the surface of the light transmission tube and wherein the means for providing a chemical solution introduces the chemical solution into the chamber so that the solution flows annularly over the surface of the light transmission tube.]

[11. The ultraviolet ray irradiation apparatus as claimed in claim 4, wherein a plurality of scraper rings are mounted to the frame and are reciprocated together with the frame.]

[12. The ultraviolet ray apparatus of claim 1 wherein the means for providing a chemical solution comprises a chemical solution supply pipe.]

[13. The ultraviolet ray apparatus of claim 4, wherein the rotating screw stem and drive means are configured above the tube and spaced apart therefrom so as to be above the flow level of the fluid to be irradiated.]

14. An ultraviolet light irradiation apparatus for irradiating untreated water or other fluids, comprising:

a plurality of light transmission tubes each having an internal light irradiation lamp;

a plurality of scraper rings slidably and tightly fitted to the circumference surface of each of the light transmission tubes;

said scraper rings each having an internal cleaning solution chamber;

means for reciprocally moving the scraper rings together over the circumference surface of the respective light transmission tubes to clean said light transmission tubes; and means coupled to the cleaning solution chamber of each of said scraper rings for supplying cleaning solution to said plurality of scraper rings *while said scraper rings are reciprocated along said light transmission tubes*, said means for supplying comoving with said scraper rings as they are reciprocated over said light transmission tubes*, and wherein said means for reciprocally moving said scraper rings is independent of said means for supplying cleaning solution*.

15. The ultraviolet ray apparatus of claim 14, wherein said means for supplying cleaning solution is a common supply pipe communicating with said plurality of cleaning solution chambers.

16. A method for cleaning the surface of a UV light emitting tube of a light irradiating apparatus immersed in a liquid to be treated, employing a scraper ring having an

*internal* annular chamber fitted over the tube, comprising the steps of:

reciprocating the scraper ring back and forth over the surface of the tube; [and]

feeding a chemical cleaning solution into the chamber, so as to annularly flow about the surface of the tube, while the scraper ring is reciprocated along the tube;

*and wherein said reciprocating step is not dependent on said feeding step.*

*17. The ultraviolet ray irradiation apparatus as claimed in claim 14, wherein said internal cleaning solution chamber is connected to means for recirculation of cleaning solution.*

*18. The ultraviolet ray irradiation apparatus as claimed in claim 14, wherein said internal cleaning solution chamber is connected to means for discharging of cleaning solution.*

*19. The method for cleaning the surface of a UV light emitting tube as claimed in claim 16, wherein said chemical cleaning solution in said chamber is recycled.*

*20. The method for cleaning the surface of a UV light emitting tube as claimed in claim 16, wherein said chemical cleaning solution is discharged from said chamber after flowing about the surface of the tube.*

* * * * *